(12) United States Patent
Taniguchi et al.

(10) Patent No.: US 7,196,489 B2
(45) Date of Patent: Mar. 27, 2007

(54) ROTARY SHAFT CONTROL APPARATUS

(75) Inventors: Mitsuyuki Taniguchi, Gotenba (JP);
Keisuke Imai, Fujikawaguchiko-machi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/288,282

(22) Filed: Nov. 29, 2005

(65) Prior Publication Data
US 2006/0113947 A1    Jun. 1, 2006

(30) Foreign Application Priority Data
Nov. 30, 2004  (JP) ............................. 2004-345783

(51) Int. Cl.
*G05B 1/06*    (2006.01)
(52) U.S. Cl. ................... 318/652; 318/651; 318/560; 318/603; 318/625
(58) Field of Classification Search .................... None
See application file for complete search history.

(56) References Cited

U.S. PATENT DOCUMENTS

| | | | |
|---|---|---|---|
| 3,654,480 A | 4/1972 | Stephenson | |
| 4,139,811 A | 2/1979 | Klinger | |
| 5,475,291 A * | 12/1995 | Yoshida et al. | 318/568.22 |
| 5,568,032 A * | 10/1996 | Wakui | 318/632 |
| 5,952,804 A * | 9/1999 | Hamamura et al. | 318/560 |
| 2001/0033454 A1 | 10/2001 | Cvancara | |

FOREIGN PATENT DOCUMENTS

JP    2001009791    7/2002

* cited by examiner

*Primary Examiner*—Lincoln Donovan
*Assistant Examiner*—Erick Glass
(74) *Attorney, Agent, or Firm*—Drinker Biddle & Reath LLP

(57) ABSTRACT

The invention aims to suppress or prevent the vibration that can occur due to the intervention of a low-rigidity part between detector and rotating body. An angular acceleration sensor for detecting the rotational angular acceleration of a rotating body is provided, and an angle/angular speed command value is compensated in accordance with the value of the angular acceleration.

3 Claims, 4 Drawing Sheets

ROTARY SHAFT CONTROL APPARATUS

BACKGROUND OF THE INVENTION

1. Field of the Invention

The present invention relates to an apparatus for controlling a rotary shaft in a machine tool or the like.

2. Description of the Related Art

When controlling a rotary shaft in a machine tool, it is general practice to perform feedback control by detecting the rotational angle/rotational speed of a rotating body and by computing the amount of control of a servo motor from the difference between the detected angle/speed and its command value.

However, in the control of an indexing table in a machine tool, for example, the rotating body may vibrate due to the presence of a low-rigidity part such as a joint connecting between the rotating body and the detector.

SUMMARY OF THE INVENTION

It is an object of the present invention to suppress or prevent the vibration that can occur due to the intervention of a low-rigidity part between the detector and the rotating body.

According to the present invention, there is provided a rotary shaft control apparatus comprising: a servo motor; a rotating body driven by the servo motor; a detector for detecting at least one of the rotational angle and rotational angular speed of the rotating body; a control processor for computing the amount of control of the servo motor, based on a detection value fed from the detector and on a command value for at least one of the rotational angle and rotational angular speed of the rotating body; an angular acceleration detector for detecting rotational angular acceleration of the rotating body; and a compensation calculator for compensating at least one of the rotational angle command value, the rotational angular speed command value, and an electric current command value for the servo motor, in accordance with the rotational angular acceleration detected by the angular acceleration detector.

Preferably, the angular acceleration detector is mounted on the rotating body.

The angular acceleration detector may be constructed by combining an angular speed detector for detecting the angular speed and a differentiator for obtaining the rotational angular acceleration by differentiating the detected rotational angular speed. Here, instead of the angular acceleration detector and in addition to the detector for detecting at least one of the rotational angle and rotational angular speed of the rotating body, an angular speed detector may be provided on the rotating body, and the compensation calculator may calculate the angular acceleration by differentiating the angular speed value and compensate the command value accordingly.

As the torque acting on the rotary shaft is proportional to the angular acceleration, the vibration can be suppressed or prevented by detecting the angular acceleration and compensating the command value accordingly.

DESCRIPTION OF THE PREFERRED EMBODIMENTS

Figure 1:
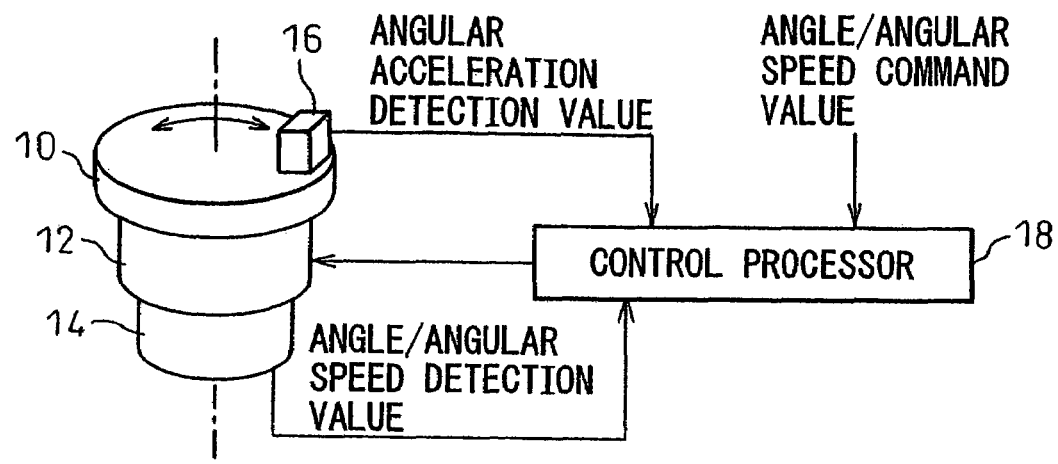
FIG. 1 is a diagram showing one example of a rotary shaft control apparatus according to the present invention.

FIG. 1 shows one example of a rotary shaft control apparatus according to the present invention. This rotary shaft control apparatus is used, for example, to control an indexing table in a machine tool.

In FIG. 1, a rotating body 10 is connected to a servo motor 12 to which an angle/angular speed detector 14 such as an encoder is also connected. The angular speed is obtained, for example, from the time differentiation of the angle that the encoder outputs.

An angular acceleration sensor 16 for detecting the rotational angular acceleration of the rotating body 10 is mounted on the rotating body 10. A control processor 18 performs processing for compensating an angle/angular speed command value in accordance with an angular acceleration detection value fed from the angular acceleration sensor 16, in addition to the conventional processing for calculating an electric current control value for the servo motor 12 from the angle/angular speed command value and angle/angular speed detection value and for supplying the electric current control value to the servo motor 12. The details of the control processing performed in the control processor 18 will be described later. Instead of detecting the angular acceleration by using the conventional angular acceleration sensor such as shown in FIG. 1, the angular acceleration may be obtained, for example, from the time differentiation of the angular speed detection value detected by the angle/angular speed detector 14.

Figure 2:
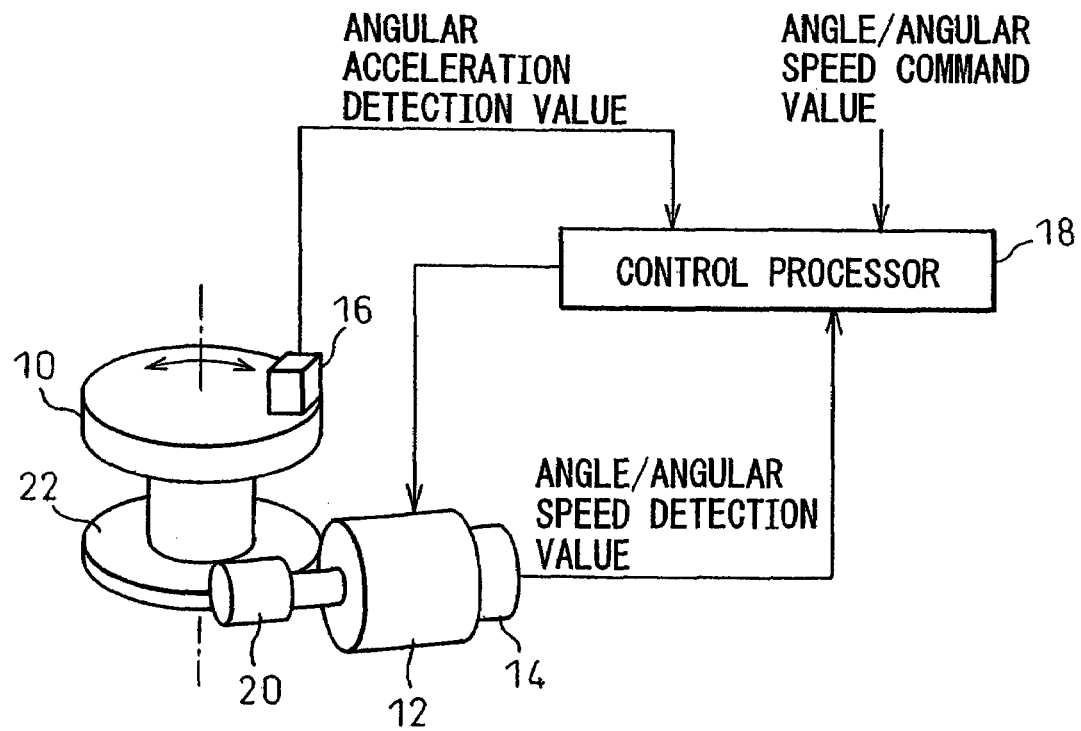
FIG. 2 is a diagram showing another example of the rotary shaft control apparatus according to the present invention.

FIG. 2 shows another example of the rotary shaft control apparatus according to the present invention. This example differs from the example of FIG. 1 in that the servo motor 12 and the rotating body 10 are connected via a worm 20 and a gear 22.

Figure 3:
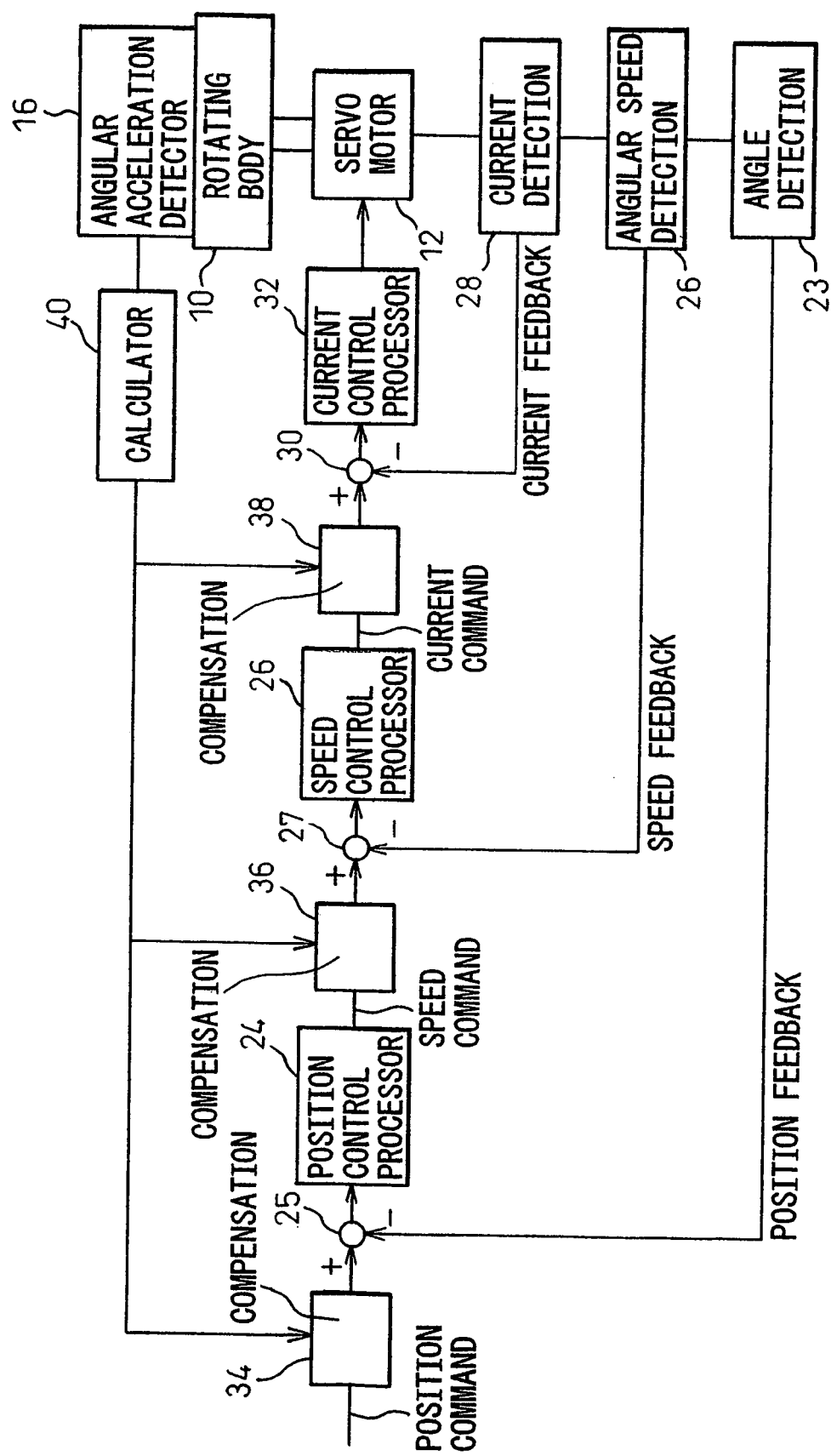
FIG. 3 is a diagram showing the details of control processing performed in a control processor 18.

FIG. 3 is a block diagram showing the details of the control processing performed in the control processor 18 shown in FIG. 2.

In FIG. 3, the angle detection value 23 detected by the encoder connected to the servo motor 12 is used as a position feedback signal and, from the difference (25) between this signal and a position command, a position control processor 24 computes a speed command using, for example, a known PID operation. Next, the detected angular speed value 26 is used as a speed feedback signal and, from the difference (27) between this signal and the speed command, a speed control processor 26 computes an electric current command using, for example, a known PID operation. Further, the electric current of the servo motor 12 is detected and, from the difference (30) between the electric current detection value 28 and the electric current command, an electric current control processor 32 computes an electric current control value using, for example, a known PID operation, and supplies the control value to the servo motor 12.

The value of the rotational angular acceleration of the rotating body 10 detected by the angular acceleration sensor 16 mounted on the rotating body 10 is used for the compensation (34) of the position command, the compensation (36) of the speed command, and the compensation (38) of the electric current command. The calculation for the compensation is carried out in a calculator 40 using, for example, the following equation.

(Compensated command value)=(Command value before compensation)+(Coefficient)×(Angular acceleration detection value)

The coefficient in the above equation is determined by trial and error so that the vibration of the rotating body is suppressed or eliminated.

Figure 4:
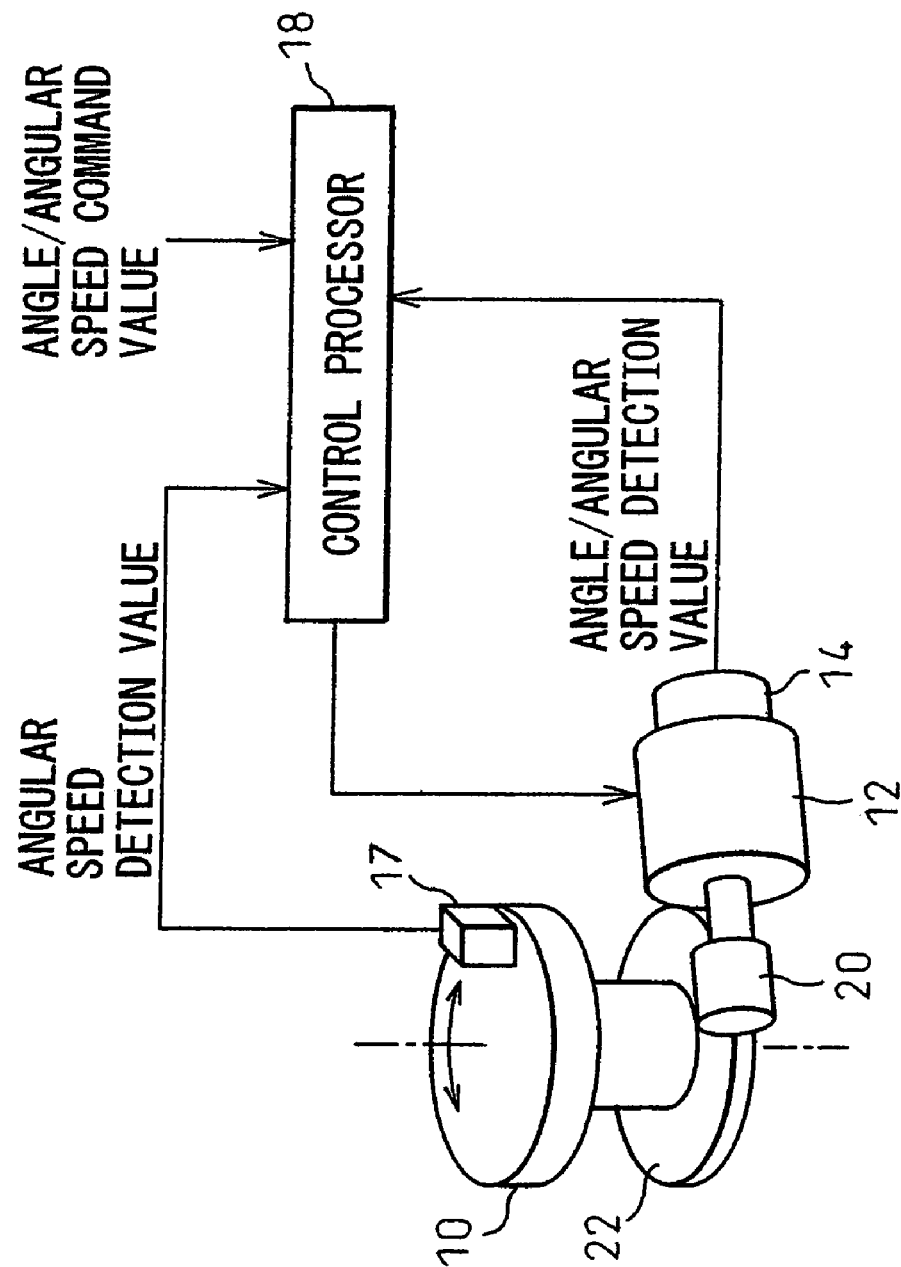
FIG. 4 is a diagram showing another example of the rotary shaft control apparatus according to the present invention.

FIG. 4 shows another example of the rotary shaft control apparatus according to the present invention. This example differs from the examples of FIGS. 1 and 2 in that angular acceleration of the rotating body 10 is obtained by using a unit 17 that differentiates a detected rotational angular speed of the rotating body 10.

Figure 5:
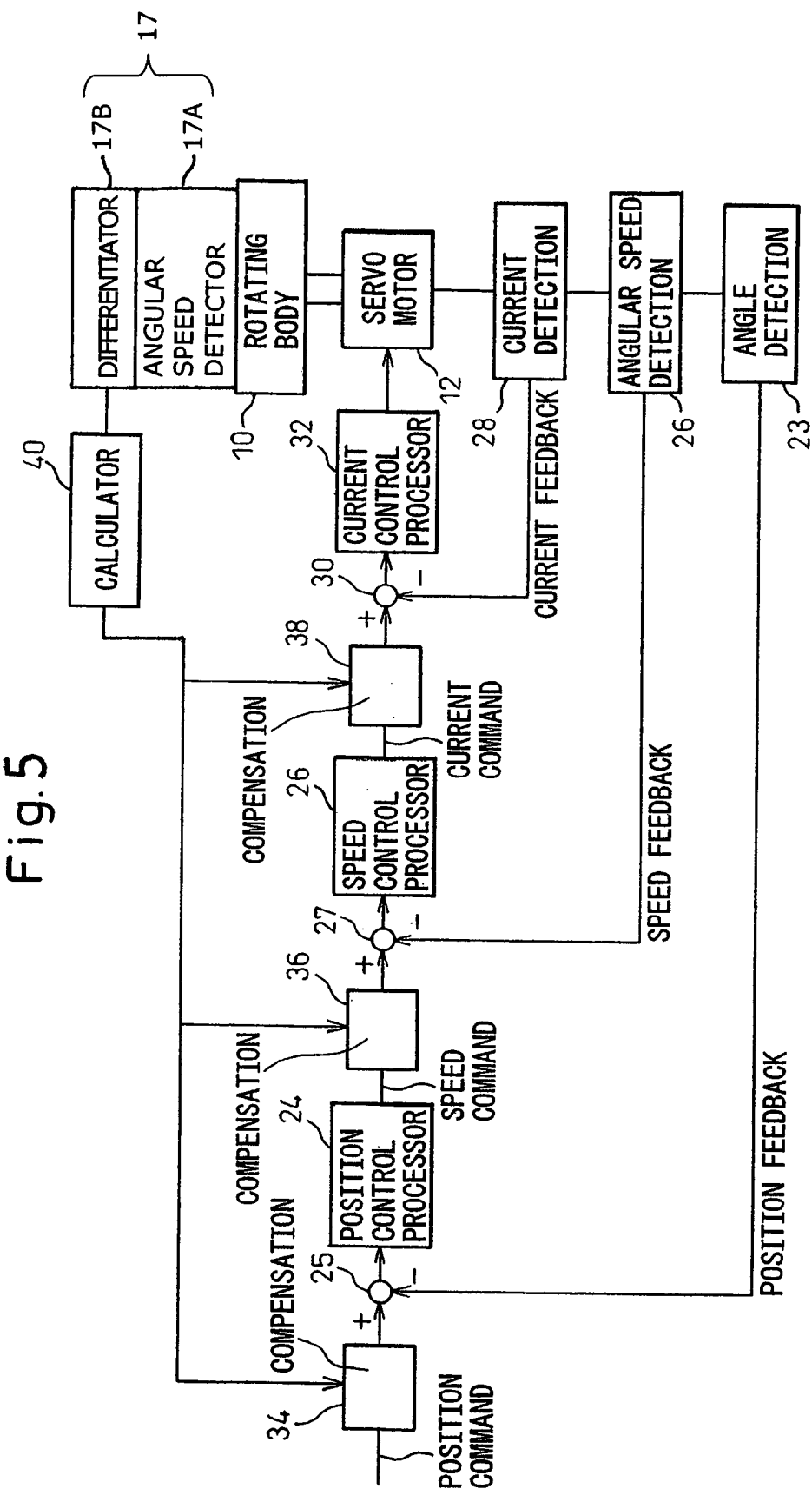
FIG. 5 is a diagram showing the details of an alternative control processing performed in a control processor 18.

FIG. 5 is a block diagram showing the details of the alternative control processing performed in the control processor 18 shown in FIG. 4. Instead of detecting angular acceleration by using the angular acceleration sensor 16, as shown in FIGS. 1 and 2, the unit 17 combines an angular speed sensor 17A forb detecting angular speed of the rotating body 10 and a differentiator 17B for obtaining rotational angular acceleration by differentiating the detected rotational angular speed. Like the angular acceleration sensor 16, the angular speed sensor 17A is mounted on the rotating body 10. The differentiator 17B may be integrated together with the angular speed sensor 17A (as shown in FIG. 5), or may be integrated together with the calculator 40.

The invention claimed is:

1. A rotary shaft control apparatus comprising:
   a servo motor;
   a rotating body driven by said servo motor;
   a detector for detecting at least one of a rotational angle and a rotational angular speed of said rotating body; and
   a control processor for computing an amount of control of said servo motor, based on a detection value fed from said detector and on at least one of a rotational angle command value and a rotational angular speed command value of said rotating body, wherein
   said rotary shaft control apparatus includes, in addition to said detector, an angular acceleration detector mounted on said rotating body and detecting rotational angular acceleration of said rotating body, and a compensation calculator for compensating at least one of said rotational angle command value, said rotational angular speed command value, and an electric current command value for said servo motor, in accordance with said rotational angular acceleration detected by said angular acceleration detector.

2. A rotary shaft control apparatus comprising:
   a servo motor;
   a rotating body driven by said servo motor;
   a detector for detecting at least one of a rotational angle and a rotational angular speed of said rotating body; and
   a control processor for computing an amount of control of said servo motor, based on a detection value fed from said detector and on at least one of a rotational angle command value and a rotational angular speed command value of said rotating body, wherein
   said rotary shaft control apparatus includes, in addition to said detector, an angular speed detector mounted on said rotating body and detecting rotational angular speed of said rotating body, and a differentiator for obtaining rotational angular acceleration by differentiating said rotational angular speed detected by said angular speed detector, and a compensation calculator for compensating at least one of said rotational angle command value, said rotational angular speed command value, and an electric current command value for said servo motor, in accordance with said obtained rotational angular acceleration.

3. A rotary shaft control apparatus according to claim 2, wherein said angular speed detector and said differentiator are integrated together as a single entity.

* * * * *